United States Patent

Blumenthal et al.

[11] Patent Number: 5,230,532
[45] Date of Patent: Jul. 27, 1993

[54] APPARATUS FOR INFLATING A VEHICLE OCCUPANT RESTRAINT

[75] Inventors: Jack L. Blumenthal, Los Angeles; Peter Staudhammer, Rolling Hills Estates, both of Calif.

[73] Assignee: TRW Vehicle Safety Systems Inc., Lyndhurst, Ohio

[21] Appl. No.: 855,205

[22] Filed: Mar. 20, 1992

[51] Int. Cl.⁵ .................................... B60R 21/10
[52] U.S. Cl. ........................................ 280/741
[58] Field of Search .............. 280/735, 736, 741, 728; 102/202.8, 275.6

[56] References Cited

U.S. PATENT DOCUMENTS

| | | |
|---|---|---|
| 3,695,179 | 10/1972 | Rainone et al. ............... 280/741 |
| 3,791,302 | 2/1974 | McLeod ................. 102/70.2 A |
| 3,806,153 | 4/1974 | Johnson . |
| 3,822,895 | 7/1974 | Ochiai . |
| 3,868,124 | 2/1975 | Johnson . |
| 3,895,821 | 7/1975 | Schotthoefer et al. . |
| 4,896,898 | 1/1990 | Lenzen et al. ................ 280/741 |

Primary Examiner—Jesûs D. Sotelo
Attorney, Agent, or Firm—Tarolli, Sundheim & Covell

[57] ABSTRACT

An apparatus for inflating an inflatable device includes a container for containing gas in a chamber. The apparatus also includes a combustible metallic wire in the chamber and an igniter for igniting the combustible metallic wire. The gas in the chamber is warmed and increased in pressure by combustion of the combustible metallic wire. The warmed and pressurized gas is directed to the inflatable device to inflate the inflatable device.

34 Claims, 2 Drawing Sheets

APPARATUS FOR INFLATING A VEHICLE OCCUPANT RESTRAINT

FIELD OF THE INVENTION

The present invention relates to a new and improved apparatus for inflating an inflatable device such as a vehicle occupant restraint.

BACKGROUND OF THE INVENTION

Known structures for inflating a vehicle occupant restraint are disclosed in U.S. Pat. Nos. 3,806,153, 3,868,124 and 3,895,821. In each of the structures disclosed in these patents, air, or other gas, and solid gas generating material are stored in a container. Upon the occurrence of a high rate of vehicle deceleration indicative of a collision, the gas in the container is released to inflate a vehicle occupant restraint which restrains a vehicle occupant during the collision. Also, upon the occurrence of a high rate of vehicle deceleration which is indicative of a vehicle collision, the gas generating material is ignited. As the gas generating material burns, it forms hot gases or vapors which heat and mix with the stored gas. The heated mixture of gases flows into the vehicle occupant restraint.

SUMMARY OF THE INVENTION

The present invention provides a new and improved apparatus for inflating an inflatable device. The apparatus includes a containing means for containing gas, including oxygen, in a chamber. A combustible means warms and increases the pressure of the gas in the chamber. The combustible means includes a combustible metallic strip in the chamber. The combustible metallic strip can be in the form of wire, shredded foil, or similar configurations. The apparatus also includes an igniter means and a directing means. The igniter means ignites the combustible metallic strip. The directing means directs the gas from the containing means to the inflatable device.

In a preferred embodiment of the invention, the inflatable device is a vehicle occupant restraint. The chamber for the gas is in a sealed container. The combustible metallic strip is in the form of zirconium wire or foil, and extends substantially throughout the chamber. The igniter means ignites the zirconium wire upon the occurrence of a high rate of vehicle deceleration which is indicative of a vehicle collision. Combustion of the zirconium wire with oxygen warms the gas in the chamber and thus increases the pressure of the gas in the chamber. The gas is released from the chamber and directed through a suitable filter device to the vehicle occupant restraint to inflate the vehicle occupant restraint.

In accordance with the present invention, the inflation of an inflatable device can be controlled to provide a desired volume of the inflatable device at any given time. In one embodiment of the invention, the gas is released from the chamber when the pressure of the gas reaches a predetermined level. The time at which the pressure reaches that level, and therefore the time at which the gas is first directed into the inflatable device, and the rate of gas delivery to the device, can be controlled by controlling the rate of combustion of the metallic strip and by the physical characteristics of the chamber and the directing means. If the combustion of the metallic strip occurs rapidly, the gas pressure will increase rapidly, and the gas will be released to inflate the inflatable device sooner than if the combustion of the metallic strand occurs more slowly. Likewise, the cross sectional area, length and geometry of the directing device also afford a control of the gas flow.

The rate of combustion of a given quantity the of metallic strip depends on a number of factors, including the metal of which the strip is formed, the geometry and relative surface area of the strip, and the oxygen content of the gas. The rate of combustion of the metallic wire can be increased by increasing the oxygen content of the gas, and can be decreased by decreasing the oxygen content of the gas. However, there should be sufficient oxygen to support the substantial combustion of the metallic strip.

The rate of combustion of a given quantity of the metallic strip also depends on the manner in which the metallic strip is ignited. The entire surface of the metallic strip can be ignited substantially simultaneously by resistively heating all of the strip. This would cause the entire length of the metallic strip to burn concurrently. Alternatively, the metallic strip could be ignited at one or more locations along its length, by electrical or other means.

BRIEF DESCRIPTION OF THE DRAWINGS

The foregoing and other features of the present invention will become apparent to those skilled in the art to which the present invention relates from reading the following specification with reference to the accompanying drawings, in which.

DESCRIPTION OF EMBODIMENTS OF THE INVENTION

Embodiment I

Figure 1:
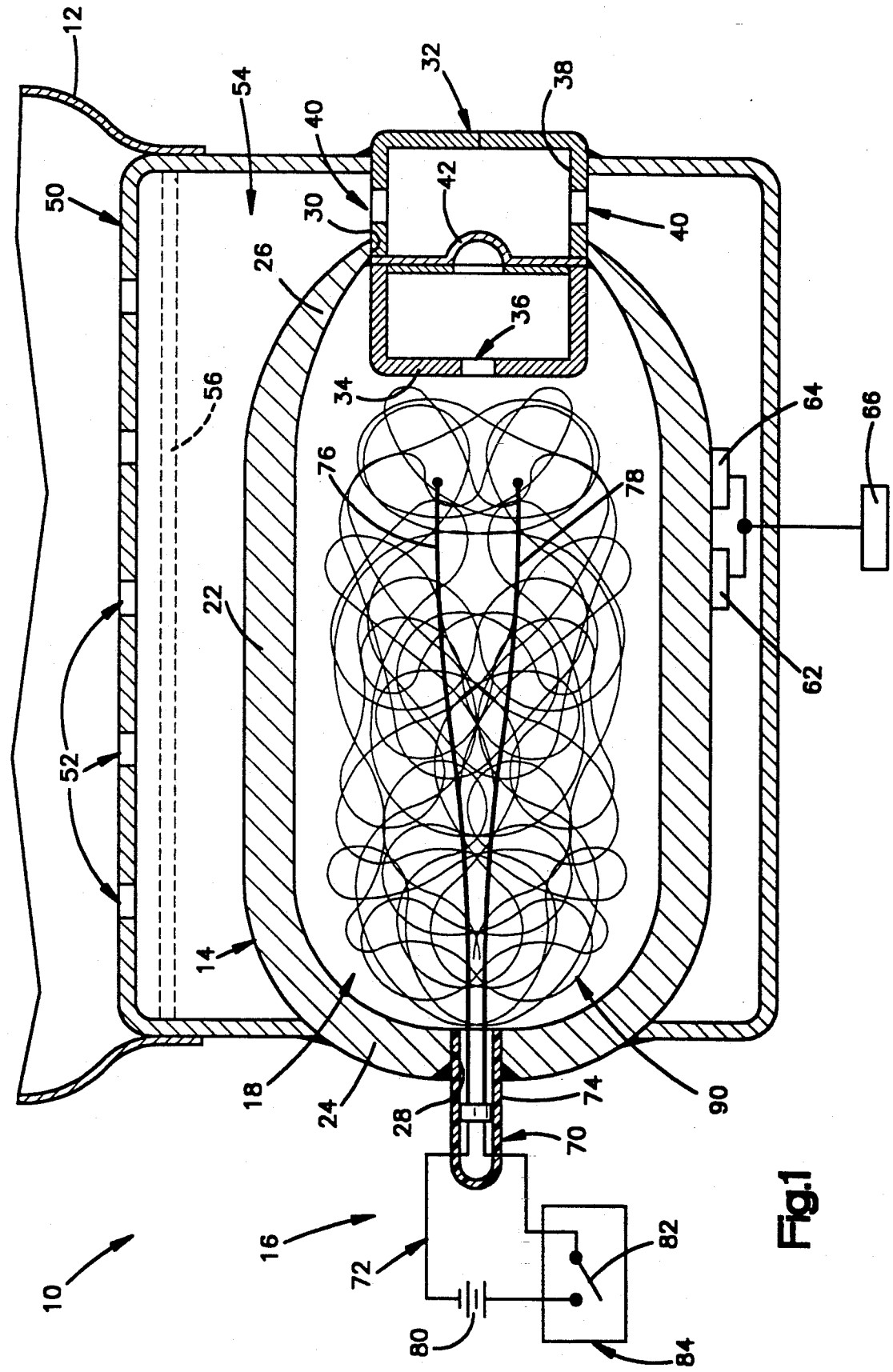
FIG. 1 is a schematic illustration of a first embodiment of the present invention.

The present invention can be embodied in a number of different structures. As shown schematically in FIG. 1, a first embodiment of the invention is a vehicle occupant restraint apparatus 10. The apparatus 10 includes an inflatable vehicle occupant restraint 12, commonly referred to as an air bag. The vehicle occupant restraint 12 is inflated in response to vehicle deceleration indicative of a collision. The vehicle occupant restraint 12, when inflated, restrains movement of the vehicle occupant and protects the vehicle occupant from forcibly striking structural parts of the vehicle.

The apparatus 10 also includes a container 14 and an actuating apparatus 16. The container 14 has a sealed chamber 18 containing gas, including oxygen. The actuating apparatus 16 warms and increases the pressure of the gas in the chamber 18 upon the occurrence of a predetermined high rate of vehicle deceleration indicative of a vehicle collision. When the gas in the chamber 18 reaches a predetermined elevated pressure, it is released from the container 14 and directed into the vehicle occupant restraint 12. The vehicle occupant restraint 12 is thereby inflated into a location in the vehicle in which it restrains movement of a vehicle occupant.

The container 14 has a cylindrical side wall portion 22, a substantially hemispherical first end wall portion 24, and a substantially hemispherical second end wall portion 26. The first end wall portion 24 has a surface 28 defining a passage through the first end wall portion 24.

The second end wall portion 26 has a surface 30 defining an opening through the second end wall portion 26.

A manifold 32 is attached to and preferably extends through the opening in the second end wall portion 26 of the container 14. An end wall 34 of the manifold 32 is located inside the chamber 18 and has a control orifice 36. The side wall 38 of the manifold 32 has an array of gas flow openings 40. The manifold 32 contains a burst disk 42 at a location between the control orifice 36 and the gas flow openings 40. The burst disk 42 blocks the flow of gas from the control orifice 36 to the gas flow openings 40. The burst disk 42 ruptures upon the application of a predetermined level of pressure on the side of the burst disk 42 facing the control orifice 36.

The apparatus 10 further includes a diffuser 50 having a plurality of gas flow openings 52. The diffuser 50 surrounds the container 14 and the manifold 32, and thus defines a plenum 54 communicating the gas flow openings 40 in the manifold 32 with the gas flow openings 52 in the diffuser 50. The diffuser 50 contains a filter element 56, as shown schematically in the drawings. The filter element 56 filters any entrained particulate material. Such a filter element is known in the art.

The gas for inflating the vehicle occupant restraint 12 is preferably stored in the chamber 18 under pressure. A pair of strain gauges 62 and 64 are mounted on the outside of the container 14. The strain gauges 62 and 64 detect dimensional changes in the container 14 which result from a change in the pressure differential between the chamber 18 and the exterior of the container 14. The strain gauges 62 and 64 thus detect leakage of the gas from the chamber 18. A monitoring apparatus 66 monitors the strain gauges 62 and 64, and provides a signal for notifying a vehicle occupant when a critical amount of leakage is detected. Alternatively, other means for sensing and monitoring the chamber pressure can be used.

The actuating apparatus 16 comprises an igniter 70 and an electrical circuit 72 including the igniter 70. The igniter 70 has a housing 74 which is received in the passage in the first end wall portion 24 of the container 14. The housing 74 and the passage are sealed to prevent the gas in the chamber 18 from leaking past the housing 74. A pair of electrical lead wires 76 and 78 extend from the housing 74 into the chamber 18. The portions of the lead wires 76 and 78 extending into the chamber 18 are uninsulated. Preferably, the lead wires 76 and 78 extend from the first end wall potion 24 of the container 14 nearly to the second end wall portion 26, as shown in FIG. 1. The length and spacing of the lead wires 76 and 78 in the chamber 18 may be varied to control ignition and combustion rate.

In addition to the igniter 70, the electrical circuit 72 includes a power source 80, which is preferably the vehicle battery and/or a capacitor, and a normally open switch 82. The switch 82 is preferably part of a vehicle deceleration sensor 84. The deceleration sensor 84 senses a predetermined rate of vehicle deceleration indicative of a collision and closes the switch 82 in response to the predetermined rate of vehicle deceleration. Such a deceleration sensor is known in the art.

The actuating apparatus 16 further includes a combustible metallic strip 90 in the gas in the chamber 18. The combustible metallic strip can be in one or more pieces. In this preferred embodiment of the invention, the combustible metallic strip is in the form of a single piece of combustible metallic wire 90. The combustible metallic wire 90 is longer than the greatest distance across the inside of the chamber 18, and is distributed substantially throughout the entire chamber 18 and the gas in the chamber 18. As an alternative, the combustible metallic wire 90 may be distributed through selected portions of the chamber 18 to heat gas preferentially in selected parts of the chamber volume. The combustible metallic wire 90 also contacts and extends between the uninsulated electrical lead wires 76 and 78 at a plurality of different locations along the lead wires 76 and 78. As a result of the multiple contacts, the combustible metallic wire 90 defines a plurality of parallel circuit paths extending between the lead wires 76 and 78. As shown in FIG. 1, the combustible metallic wire 90 is arranged in a random pattern. However, it could be arranged in an orderly pattern, uniformly distributed throughout the chamber 18 and have an orderly pattern of contacts with the lead wires 76 and 78.

Preferably, the combustible metallic wire 90 is formed of zirconium. However, materials other than zirconium can be used for the combustible metallic wire 90. For example, aluminum or magnesium could be used. Applicants believe zirconium and aluminum burns predominantly at the surface of the wire, and thereby produces an integral oxide ceramic ash. Other materials such as magnesium may burn in a vapor phase and may therefore have a tendency to produce smoke particles. Zirconium does not burn in the vapor phase because it has an extremely high boiling point of 6,472° F. This high boiling point precludes vaporization of the zirconium during combustion because the boiling point is above the zirconium combustion temperature. On the other hand, magnesium boils at 2,024° F., which is below its combustion temperature. With zirconium, minimal or no filtering of the effluent gas may be required.

The gas in the chamber 18 is preferably air. However, the gas could be a mixture of an inert gas, such as nitrogen or argon, and oxygen. The mixture may be in any proportion including nearly pure oxygen.

The inflation of the vehicle occupant restraint 12 can be controlled to provide a desired inflated volume of the vehicle occupant restraint 12 as a function of time after ignition of the combustible metallic wire 90. In the embodiment of the invention shown in FIG. 1, the inflation of the vehicle occupant restraint 12 can be controlled by controlling the rate at which the combustible metallic wire 90 burns in the gas in the chamber 18. The rate of combustion of the metallic wire 90 is preferably controlled by the rate of diffusion of oxygen to the surface of the wire 90 through the gas in the chamber 18. Therefore, the metallic wire 90 will burn faster in gas that is enriched with oxygen. The pressure of the gas in the chamber 18 will consequently increase faster. Thus, the pressurized gas will be released from the chamber 18 and directed into the vehicle occupant restraint 12 sooner than if the metallic wire 90 is burned in gas that contains less oxygen.

As an illustration of the invention, an inflatable vehicle occupant restraint with a volume of seven cubic feet is fully inflated at a maximum temperature of 640° F. (with no outside air entrainment) with about 3.0 standard cubic feet of air stored in the chamber 18. The air is stored in the chamber 18 at a pressure the equivalent of 2,000 psi at 0° F. The chamber 18 has a volume of 38 cubic inches. Zirconium wire has a heat of combustion in air of 258.2 kcal/mole of zirconium. When the zirconium burns, zirconium oxide results ($Zr + O_2 \rightarrow ZrO_2$). At 100% combustion efficiency, and a temperature drop of approximately 300° F. from the chamber 18 to the vehicle occupant restraint 12, 5.5 grams of zirconium material supplies the energy needed to enable the compressed air in the chamber 18 to fully inflate the inflatable vehicle occupant restraint 12. The 5.5 grams of zirconium material, in this example, is provided in the form of about 1,166 meters of extremely fine zirconium wire having rectangular cross sectional dimensions of 0.001×0.0015 inches. If uniformly distributed throughout the chamber 18, adjacent sections of the wire are separated by about 0.027 inches. The amount of zirconium material in the chamber 18 may be increased to compensate for any incomplete combustion and heat losses.

When the vehicle experiences a collision, the deceleration sensor 84 senses the deceleration of the vehicle that is caused by the collision and closes the switch 82. Electric current then flows from the vehicle battery 80 through the parallel circuit paths defined by the various sections of the combustible metallic wire 90 extending between the uninsulated electrical lead wires 76 and 78. The combustible metallic wire 90 is thereby resistively heated and ignited. As combustion of the metallic wire 90 proceeds, the gas in the chamber 18 is warmed. Thus, the pressure of the gas is increased. When the increasing pressure of the gas reaches a predetermined elevated level, the burst disk 42 in the manifold 32 ruptures. The gas is thus released to flow from the chamber 18 through the control orifice 36 and past the ruptured burst disk 42 to the gas flow openings 40. The flow of pressurized gas continues from the gas flow openings 40 through the plenum 54, the filter element 56 and the gas flow openings 52 to the vehicle occupant restraint 12.

When electric current is directed to the zirconium wire in the illustration above, it is heated to its ignition temperature of approximately 900° F. Combustion of the zirconium wire in the presence of oxygen in the compressed air proceeds rapidly, with evolution of heat and a pressure rise in the chamber 18. When the rising pressure in the chamber 18 reaches about 2,700 psi, the burst disk 42 ruptures and the warm compressed air begins to flow rapidly and forcefully into the vehicle occupant restraint 12.

Ideally, the zirconium wire will continue to burn as the air flows into the vehicle occupant restraint 12 such that the pressure in the chamber 18 remains nearly constant during inflation of the vehicle occupant restraint 12. This is possible if continued combustion of the zirconium wire adds heat to the air remaining in the chamber 18 as the air flows into the vehicle occupant restraint 12. The zirconium wire of the present example is expected to burn for about 0.065 seconds in air that is not enriched with oxygen. The zirconium wire is expected to burn for about 0.022 seconds in air that is enriched with oxygen (e.g., 50% $O_2$ and 50% $N_2$). Preferably, the air is enriched with oxygen to cause the zirconium wire to burn in a time interval between 0.022 seconds and 0.065 seconds. Given a specific material, quantity and geometry of the combustible metallic wire 90, and the quantity of gas in the chamber 18, the degree of oxygen enrichment of the gas serves as a control factor for the rate of combustion of the wire 90.

The rate of combustion may also be controlled by changing the form and physical dimensions of the wire. The wire may be of any length and cross section including flat ribbon or foil-like form.

Embodiment II

Figure 2:
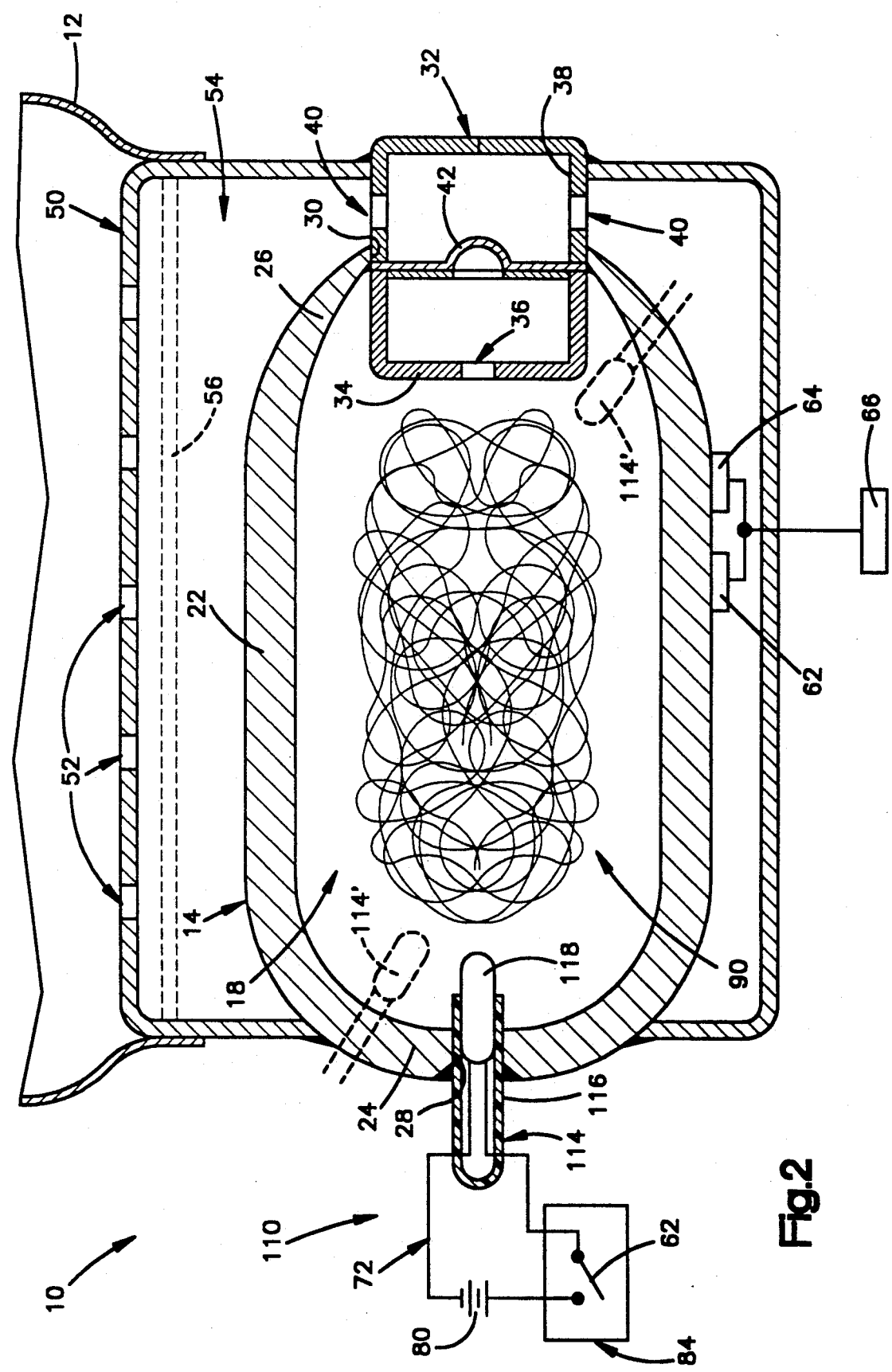
FIG. 2 is a schematic illustration of a second embodiment of the present invention.

As shown schematically in FIG. 2, a second embodiment of the present invention is a vehicle occupant restraint apparatus 100 which is similar to the vehicle occupant restraint apparatus 10 described above. Parts of the apparatus 100 are the same as parts of the apparatus 10, such as the inflatable vehicle occupant restraint 12 and the chamber 18 containing gas. Those parts have the same reference numbers in FIG. 2 as in FIG. 1. In the second embodiment of the invention, an actuating apparatus 110 warms and increases the pressure of the gas in the chamber 18 upon the occurrence of a predetermined high rate of vehicle deceleration, such as occurs in a vehicle collision. When the gas in the chamber 18 reaches a predetermined elevated pressure, it is released from the chamber 18 and directed into the vehicle occupant restraint 12. As in the first embodiment of the invention described above, the vehicle occupant restraint 12 is thereby inflated into a location in the vehicle in which it restrains movement of a vehicle occupant and protects the vehicle occupant from forcefully striking structural parts of the vehicle in the event of a collision.

The actuating apparatus 110 comprises an electrical circuit 112 which includes a igniter 114 connected with the power source 80 and the vehicle deceleration sensor 84. The igniter 114 has a housing 116 supporting a squib 118 containing pyrotechnic material. The squib 118 emits products of combustion of the pyrotechnic material in a known manner when electrically actuated.

When the vehicle experiences a collision, the deceleration sensor 84 senses the deceleration of the vehicle that is caused by the collision, and responds by closing a switch 82 in the circuit 112. Electric current then flows from the power source 80 through the igniter 114 to actuate the pyrotechnic squib 118. The products of combustion emitted by the squib 118 ignite the portions of the combustible metallic wire 90 that are located adjacent to the squib 118. Combustion of the combustible metallic wire 90 then proceeds along the length of the wire 90 from the portions ignited by the squib 118. The gas in the chamber 18 is thus warmed and increased in pressure as combustion of the combustible metallic wire 90 proceeds. When the rising pressure of the gas reaches a predetermined elevated level, the burst disk 42 ruptures. The gas is thus released to flow from the container 14 and into the vehicle occupant restraint 12 to inflate the vehicle occupant restraint 12.

In the embodiment of the invention shown in FIG. 2, the inflation of the vehicle occupant restraint 12 can be controlled by controlling the ignition of the combustible metallic wire 90. For example, if the combustible metallic wire 90 is ignited by a single squib 118 located at one end of the chamber 18 as shown in FIG. 2, combustion of the metallic wire 90 will occur progressively from the one end of the chamber 18 toward the other end of the chamber 18.

If a greater rate of combustion of the metallic wire 90 in the apparatus 100 is desired, a larger squib, or one or more additional igniters 114' could be used at locations adjacent to or remote from the igniter 114. Two such additional igniters 114' are shown schematically in dashed lines in FIG. 2. As the number and or size of additional igniters 114' is increased, the rate of combustion of the metallic wire 90 will likewise be increased. The size, number and location of the igniters 114 and 114' thus serve as control factors for the rate of combustion of the metallic wire 90.

From the above description of the invention, those skilled in the art will perceive improvements, changes and modifications in the invention. Such improvements, changes and modifications within the skill of the art are intended to be covered by the appended claims.

Having described the invention, the following is claimed:

1. An apparatus for inflating an inflatable device, said apparatus comprising:
   containing means for containing gas in a chamber;
   combustible means for warming and increasing the pressure of gas in said chamber, said combustible means including a combustible metallic strip and gas comprising oxygen in said chamber;
   igniter means for igniting said combustible metallic strip; and
   directing means for directing the gas from said containing means to the inflatable device.

2. An apparatus as defined in claim 1 wherein said inflatable device is an inflatable vehicle occupant restraint.

3. An apparatus as defined in claim 1 wherein said combustible metallic strip is at least partially in the form of wire.

4. An apparatus as defined in claim 1 wherein said combustible metallic strip is at least partially in the form of shredded foil.

5. An apparatus as defined in claim 1 wherein said combustible metallic strip comprises wire formed of zirconium.

6. An apparatus as defined in claim 1 wherein said combustible metallic strip comprises wire formed of aluminum.

7. An apparatus as defined in claim 1 wherein said combustible metallic strip is distributed substantially uniformly throughout said chamber.

8. An apparatus as defined in claim 1 wherein said combustible metallic strip is distributed in selected parts of said chamber.

9. An apparatus as defined in claim 1 wherein said combustible metallic strip is distributed in said chamber in an ordered manner.

10. An apparatus as defined in claim 1 wherein said combustible metallic strip is distributed in said chamber in an unordered manner.

11. An apparatus as defined in claim 1 wherein said combustible metallic strip has a total length which is longer than the greatest distance across the interior of said chamber.

12. An apparatus as defined in claim 1 wherein said combustible metallic strip is formed substantially of a metallic material which is combustible in said gas in said chamber at a temperature below the boiling point of said metallic material.

13. An apparatus as defined in claim 1 wherein said igniter means includes means for directing electric current through said combustible metallic strip.

14. An apparatus as defined in claim 13 wherein said means for directing electric current includes a pair of electrically conductive elements spaced from each other in said chamber, said combustible metal strip extending from one of said elements to the other of said elements to conduct electric current from said one element to said other element.

15. An apparatus as defined in claim 14 wherein said combustible metallic strip has a plurality of sections extending between said electrically conductive elements to define a plurality of parallel circuit paths extending between said electrically conductive elements.

16. An apparatus as defined in claim 1 wherein said igniter means includes means for igniting a portion of said combustible metallic strip for combustion to proceed from said portion along the length of said strip.

17. An apparatus as defined in claim 16 wherein said igniter means includes means for igniting said combustible metallic strip at a plurality of locations spaced apart along the length of said strip.

18. An apparatus as defined in claim 1 wherein said igniter means comprises a pyrotechnic material and means for igniting said pyrotechnic material.

19. An apparatus as defined in claim 1 wherein said inflatable device is an inflatable vehicle occupant restraint, and said igniter means comprises means for detecting a predetermined rate of deceleration of a vehicle and means for igniting said combustible metallic strip in response to detection of said predetermined rate of deceleration.

20. An apparatus as defined in claim 1 wherein said containing means releases the gas from said chamber when the pressure of the gas is increased to a predetermined level by said combustible means.

21. An apparatus as defined in claim 20 wherein said containing means includes a sealed container having a wall means for rupturing under said predetermined level of pressure.

22. An apparatus as defined in claim 1 wherein said directing means comprises a filter for filtering the gas directed to the inflatable device.

23. An apparatus as defined in claim 1 wherein said gas in said chamber comprises pressurized air.

24. An apparatus as defined in claim 1 wherein said gas in said chamber comprises pressurized air enriched with oxygen.

25. An apparatus as defined in claim 1 wherein said gas in said chamber comprises pressurized air depleted in oxygen 26. An apparatus as defined in claim 1 wherein said gas in said chamber comprises a mixture of oxygen, nitrogen and argon.

27. An apparatus as defined in claim 1 wherein said gas in said chamber comprises a mixture of oxygen, nitrogen, argon and other gases to modify combustion rate and heat release.

28. An apparatus as defined in claim 1 wherein said containing means contains gas, said containing means releasing said gas from said chamber when the pressure of said gas is increased to a predetermined level by said combustible means, the quantity, initial pressure and composition of said gas being predetermined to yield a predetermined rate of release of said gas from said chamber.

29. An apparatus as defined in claim 1 wherein said containing means contains gas, said containing means releasing said gas from said chamber when the pressure of said gas is increased to a predetermined level by said combustible means, the quantity, surface area and geometry of said combustible metallic strip being predetermined to yield a predetermined rate of release of said gas from said chamber.

30. An apparatus as defined in claim 1 wherein said containing means contains gas, said containing means releasing said gas from said chamber when the pressure of said gas is increased to a predetermined level by said combustible means, the location of said combustible metallic strip in said chamber being predetermined to yield a predetermined rate of release of said gas from said chamber.

31. An apparatus as defined in claim 1 wherein said containing means contains gas, said containing means releasing said gas from said chamber when the pressure of said gas is increased to a predetermined level by said combustible means, said igniter means igniting said combustible metallic strip by electrically heating said combustible metallic strip at a rate which is predetermined to yield a predetermined rate of release of said gas from said chamber.

32. An apparatus as defined in claim 1 wherein said containing means contains gas, said containing means releasing said gas from said chamber when the pressure of said gas is increased to a predetermined level by said combustible means, said igniter means including a pyrotechnic igniter of a size which is predetermined to yield a predetermined rate of release of said gas from said chamber.

33. An apparatus as defined in claim 1 wherein said containing means contains gas, said containing means releasing said gas from said chamber when the pressure of said gas is increased to a predetermined level by said combustible means, said igniter means igniting said combustible metallic strip at one or more ignition zones on said strip, the number, location and extent of said ignition zones being predetermined to yield a predetermined rate of release of said gas from said chamber.

34. An apparatus as defined in claim 1 wherein said containing means contains gas, said containing means releasing said gas from said chamber when the pressure of said gas is increased to a predetermined level by said combustible means, said directing means including flow passages leading from said chamber to the inflatable device, the cross-sectional area, length and geometry of said flow passages being predetermined to yield a predetermined rate of release of said gas from said chamber.

* * * * *